United States Patent [19]

Cailly et al.

[11] Patent Number: 5,011,665
[45] Date of Patent: Apr. 30, 1991

[54] NONPOLLUTING RECOVERY OF RARE EARTH VALUES FROM RARE EARTH MINERALS/ORES

[75] Inventors: Francinet Cailly, Paris; Yves Mottot, Tremblay/Les Gonesse, both of France

[73] Assignee: Rhone-Poulenc Chimie, Courbevoie, France

[21] Appl. No.: 487,926

[22] Filed: Mar. 5, 1990

[30] Foreign Application Priority Data

Mar. 3, 1989 [FR] France ............................ 89 02757

[51] Int. Cl.$^5$ ............................................ C01F 17/00
[52] U.S. Cl. ...................................... 423/21.5; 75/743; 423/658.5
[58] Field of Search .................... 423/658.5, 21.5; 75/743

[56] References Cited

U.S. PATENT DOCUMENTS

| | | | |
|---|---|---|---|
| 1,084,600 | 1/1914 | Best | 423/658.5 |
| 2,955,913 | 10/1960 | Peppard et al. | 423/21.5 |
| 4,834,793 | 5/1989 | Schneider et al. | 75/743 |

FOREIGN PATENT DOCUMENTS 0233810 3/1986 German Democratic Rep. .................................... 423/21.5

OTHER PUBLICATIONS

The Extraction of Thorium and Some Lower Lanthanide Nitrates by Dibutyl Butyl Phosphonate, P. G. Manning, Canadian Journal of Chemistry, vol. 40, pp. 1684–1689.

Primary Examiner—R. Dean
Assistant Examiner—R. D. Flatter
Attorney, Agent, or Firm—Burns, Doane, Swecker & Mathis

[57] ABSTRACT

Rare earth values are nonpollutingly recovered from a rare earth mineral/ore, especially one containing but minor amounts of the rare earths, by (a) leaching-/decomposing such rare earth mineral/ore with a solution of nitric acid to solubilize the rare earth values contained therein, (b) optionally separating insoluble residue from the resulting leach solution, (c) separating the rare earth values from the leach solution, (d) treating the leach solution thus stripped of rare earth values with a hydroxide of a metallic cation M to precipitate solubilized impurities and separating the thus precipitated impurities therefrom, (e) treating the resulting purified solution with sulfuric acid to precipitate metal sulphates and separating the thus precipitated sulfates therefrom to regenerate the above nitric acid solution, and (f) optionally recycling such regenerated solution of nitric acid to the leaching/decomposition step (a).

33 Claims, 2 Drawing Sheets

NONPOLLUTING RECOVERY OF RARE EARTH VALUES FROM RARE EARTH MINERALS/ORES

BACKGROUND OF THE INVENTION

1. Field of the Invention

The present invention relates to the recovery of rare earth values from rare earth containing minerals, and, more especially, to the recovery of rare earth values from minerals having but minor amounts of the rare earths contained therein. 2. Description of the Prior Art At the present time, the rare earths are principally recovered by the processing of such minerals as monazite, bastnasite and xenotime. Other than these particular ores, which are the highest in rare earth contents, there exist numerous other minerals containing far lesser amounts of the rare earths, the exploitation and processing of which has not been economical to date. Particularly representative of such "poorer" minerals are those containing apatite, which have a content by weight of the rare earths, expressed as the oxides thereof, of less than 0.1%.

If a mineral has a low content of the rare earth elements, it is necessary to first enrich it by subjecting it to a physical treatment, e.g., gravimetry, flotation or magnetic separation. Such a process, which is in addition to the chemical treatment required to recover the rare earth elements, is expensive and seriously adversely affects the economics of the process.

SUMMARY OF THE INVENTION

Accordingly, a major object of the present invention is the provision of an improved process for the recovery of rare earth values from the rare earth containing minerals, especially those containing only lesser amounts of the rare earths, which improved process permits eliminating, or at very least limiting, the need for the preliminary enrichment of the mineral that to date has characterized the state of this art.

Another object of this invention is the provision of an improved process for the recovery of rare earth values from any type of mineral or residue containing rare earth elements, regardless of their concentration.

Briefly, the present invention features the recovery of rare earth values from rare earth minerals/residues, comprising:

(a) acidulating and leaching the rare earth mineral with a solution of nitric acid such that the mineral containing the rare earth values is solubilized;

(b) separating the insoluble residues, if necessary;

(c) separating the rare earths from the leach solution;

(d) treating the solution stripped of rare earth values with a hydroxide of a metallic cation M as to precipitate the impurities solubilized during the leaching step, together with the mineral containing the rare earth values, and then separating the precipitate;

(e) treating the impurity-free solution with sulfuric acid to precipitate metal sulfates and separating the precipitate therefrom; and (f) optionally recycling the nitric acid thus regenerated to the rare earth mineral decomposition step (a).

DETAILED DESCRIPTION OF THE PREFERRED EMBODIMENTS OF THE INVENTION

More particularly according to the present invention, by the expression "rare earths" (RE) are intended the rare earth elements designated the lanthanides and having atomic numbers of from 57 to 71, inclusive, and yttrium, having an atomic number of 39. By the expression "ceric rare earths" are intended the lightest elements in terms of atomic number, commencing with lanthanum and extending to samarium, and by "yttric rare earths" are intended the heaviest rare earth elements, beginning with europium and terminating with lutecium and also including yttrium.

A principal advantage of the process of the invention is that it is directly applicable to the rare earth containing mineral without requiring a preliminary physical enrichment thereof.

The process of the invention requires—as do all direct mineral decomposition processes—a high consumption of nitric acid in light of the low rare earth element content that may be obtained and the partial solubility of the mineral gangue.

However, the process of the invention is particularly advantageous from the economic point of view, as the nitric acid is regenerated in the process. Overall, the acid consumption in the process is reduced to the consumption of the sulfuric acid used for the regeneration of the nitric acid, which is economically attractive in view of the appreciably lower cost of sulfuric acid relative to that of nitric acid.

If sulfuric acid is used to carry out the leaching instead of nitric acid, rare earth values are lost by entrainment in the precipitate formed (for example gypsum) during the attack or by the precipitation of poorly soluble sulfates of the rare earth elements.

In contrast, the use of nitric acid permits the quantitative recovery of the solubilizable rare earths.

The process of the invention thus reaps the benefits of nitric acid dissolution at the cost of sulfuric acid.

From an ecological/environmental point of view, the subject process does not result in effluent pollution by the nitrate anion. By virtue of the recycle loop, the process of the invention entails only the discharge of solids. These solids are well identified and are easily processed downstream without damage to the environment.

Finally, another advantage of the process of the invention is that it makes possible the treatment of any type of mineral or residue containing the rare earths.

Indeed, the process of the invention is applicable to any type of mineral, and more especially to minerals having low rare earth contents, on the order of less than 0.1% by weight thereof, expressed as the weight of the oxides.

It will of course be appreciated that it is also within the ambit of the invention to treat mineral concentrates. Processes for the production of such concentrates are well known to this art, for example by enrichment utilizing physical methods, grinding and flotation and/or magnetic concentration, and/or other physical or chemical techniques.

It is also possible to use a starting mineral that has been subjected to a preliminary heat treatment.

In the case of minerals low in rare earth content, it is preferred to use a mineral providing a gangue that is partially insoluble in nitric acid. Exemplary such minerals are quartz and the silicates, magnetite, anatase, rutile, ilmenite, grenates and the zircons.

Starting minerals in which the rare earth carriers are the phosphates, fluocarbonates, carbonates or silicates are especially preferred according to this invention.

Exemplary of these latter minerals, the following are particularly representative (their average rare earth contents by weight, expressed as the rare earth oxides thereof, are also indicated):

(i) phosphate type minerals, such as the apatites, in which the rare earths are included in a calcium phosphate lattice $Ca_5(PO_4)_3(F, Cl, OH)$ (10%); rhabdophanite $REPO_4 \cdot H_2O$ (60%); churchite $REPO_4 \cdot H_2O$ (50%), with the rare earth consisting essentially of the yttric rare earths; the family of the crandallites, for example florencite $REAl_3(PO_4)_2(OH)_6$ (30%);

(ii) fluocarbonate type minerals, for example bastnasite $RECO_3F$ (75%), synchisite $RECa(CO_3)_2F$ (52%);

(iii) carbonate type minerals, in particular lanthanite $RE_2(CO_3)_3 \cdot 8H_2O$ (55%);

(v) silicate type minerals, in particular allanite $(RE-Ca)_2(FeAlMg)_3(SiO_4)(Si_2O_7)O(OH)$ (25%), britholite $RE_3Ca_2(SiO_4)_3OH$ (60%).

The process of the invention is particularly well adapted for the treatment of the apatites.

If a fluocarbonate type mineral is used in the process of the invention, a preliminary heat treatment should be carried out in order to facilitate the decomposition thereof and to eliminate the carbonate anion and partially the fluoride anions.

Such heat treatment entails a calcination operation carried out at a high temperature, notably at a temperature higher than 400° C. and which preferably ranges from 600° to 800° C. The duration of the calcination, which depends on the calcining temperature and which is an inverse function of temperature, generally ranges from 30 min to 3 hours.

According to the process of the present invention, it is also possible to treat any form or residue, solid or liquid, containing rare earth values.

Thus, residues containing the rare earths in salt form (phosphates, carbonates or sulfates) or residues (powders, chips, fragments, ingots, dust, and the like) typically resulting from the production of RE/Co type magnets, may be used, with the rare earth consisting essentially of samarium or RE/Fe/B, the rare earth essentially being neodymium and the atomic percentage of the elements generally being the following: 8% to 30% for the rare earth; 2% to 28% for boron and the remainder iron.

As indicated above, it is also possible to treat the tailings from iron mines still containing iron oxides and apatite. In such a case, it is desirable to first eliminate the magnetite by magnetic separation, a method which is well known to this art.

The process is also suitable for the treatment of residues of the dissolution of gypsum, in particular gypsums resulting from the sulfuric acid decomposition of phosphates and the sludges produced from the concentration of crude acids.

The above exemplification of minerals and residues is not intended to be limiting. In the description of the invention which follows, the term "mineral" is used to designate both a mineral and a residue containing rare earths.

According to the process of the invention, in a first stage the mineral is acidulated/decomposed with nitric acid.

Prior to the acid attack, a crushing and/or grinding operation may be advantageous in order to release the mineral species bearing the rare earths. The grain size distribution depends on the grain size of the pulverized material, which may vary from a few microns, generally 4 to 5 μm, to 2 mm. However, if a relatively rapid disintegration is desired, it is advantageous to employ particles having diameter of less than 1 mm.

The crushing and grinding operations may be carried out in conventional manner, for example in a jaw crusher or in a ball or bar grinder.

Following this optional operation, the mineral is subjected to a nitric acid treatment to partially decompose the mineral. More particularly, such treatment effects solubilization of the minerals containing the rare earths, while leaving the mineral gangue essentially in the insoluble form. Certain impurities of the cationic type (aluminum, iron, calcium) or the anionic type (phosphate, fluoride, carbonate) are also solubilized, but these are eliminated in a subsequent stage of the process of the invention.

To carry out the leaching of the mineral, concentrated or dilute nitric acid may be used. The concentration of the nitric acid solution is not critical, but it is desirable to use an aqueous nitric acid solution having a normality of from 1 to 8 N.

The amount of nitric acid used is a function of the rare earth content and the content of other species soluble under the conditions of the operation. It is preferably at least equal to the stoichiometric amount of the elements to be solubilized.

Good conditions of decomposition are established when the nitric acid is used in a stoichiometric excess. This excess may constitute, for example, up to 20% of the stoichiometric amount, but preferably ranges from 5% to 10% in stoichiometric excess.

The weight ratio of the mineral to the aqueous solution of nitric acid generally is less than or equal to 2 and greater than or equal to 0.2, and preferably ranges from 1 to 2.

In one embodiment of the process of the invention, the rare earth mineral is treated with nitric acid in the presence of a salt providing nitrate ions.

Exemplary of such salts are ammonium nitrate, a nitrate of an alkali metal, for example sodium nitrate, or a nitrate of a metallic cation M.

By "metallic cation M" is intended a metallic element, the hydroxide of which is a strong base, its nitrate salt is soluble and its sulfate is but poorly soluble.

By "strong base" is intended a base having a pka greater than approximately 9.0.

A "soluble salt" has a solubility in water, at 20° C., greater than about 100 g per liter.

The preferred metallic cations M according to the invention are the alkaline earth metals, such as calcium, strontium and barium.

The preferred salts for introducing the nitrate ions are the nitrates of the metal cations M, as such cation is encountered in a subsequent stage of the process of the invention.

The quantity of the salt providing the nitrate ions advantageously comprises from 1% to 80% of the nitric acid leaching solution, preferably from 40% to 60%.

One of the advantages of using a salt providing nitrate ions is to lower the sulfate content of the metal cation M present in the recycled nitric acid.

This embodiment for carrying out the decomposition is particularly advantageous, if the rare earths present in the nitric acid solution emanating from the leaching-/decomposition stage are separated by liquid/liquid extraction, as more fully described hereinafter. In effect, the presence of the neutral salt facilitates the extraction of the rare earths into the organic phase.

For the extraction to be satisfactory, the aqueous phase in contact with the organic phase at the instant of extraction must have a high concentration in nitrate ions, preferably greater than 3 moles/liter and less than 10 moles/liter. Advantageously, it is about 8 moles/liter.

The amount of the salt introducing the nitrate ions is adjusted such that the desired nitrate ion concentration is provided.

The temperature conditions are not determining regardless of whether leaching is carried out using nitric acid alone or in the presence of a salt. The temperature advantageously ranges from 15° to 100° C.

The retention time in the leaching solution depends to a certain extent on the mineral itself. It may vary widely, for example from 10 min to 5 hours, but preferably it ranges from 30 min to 2 hours.

Upon completion of this particular operation, the aqueous solution of the rare earth nitrates is separated from the solid residue by conventional liquid/liquid separation technique, for example by filtration, centrifugation, decantation or extraction.

A solid residue consisting essentially of mineral gangue, i.e., minerals insoluble under the conditions of the decomposition, is thus separated, for example silica (quartz) and/or natural silicates (feldspath) and various other minerals.

Following the separation of such residue, an aqueous solution of rare earth nitrates is recovered; it also contains impurities solubilized during the decomposition, which depend on the composition of the initial mineral. For example, the nature of the impurities primarily present in the treatment of a fluorapatite are the following: the anionic impurities are the phosphate, arsenate, and fluoride and the cations are $U^{4+}$, $Th^{4+}$, $Fe^{3+}$, $Al^{3+}$, $Ca^{2+}$, etc.

In the following stage of the process of the invention, the rare earth elements are separated from said solution.

Such separation may be carried out using any process generally available to this art, such as, for example, precipitation, liquid/liquid extraction, separation by ion exchange resin, crystallization, and the like.

In a preferred embodiment of the invention, the rare earths are separated by precipitating them in the form of their hydroxides.

This separation is especially suitable in the case of nonphosphate minerals containing but little soluble iron or aluminum, preferably less than 20% of such elements, expressed relative to the weight of the rare earths.

For this purpose, the precipitation is carried out using a base, particularly ammonium hydroxide, a hydroxide of an alkali metal, such as sodium or potassium, or of an alkaline earth metal, preferably calcium or magnesium, or a carbonate of these elements.

Even more preferably, calcium hydroxide or its precursor, calcium oxide, is used.

The amount of the base used is determined such that the pH of the solution containing the rare earth nitrates ranges from 7 to 10 and preferably is about 8.

During this stage, the temperature may vary from 20° to 100° C., but advantageously ranges from 60° to 100° C.

Under these conditions, the rare earths are precipitated; they may then be separated by conventional liquid/liquid separation techniques.

An even more preferred embodiment of the invention entails separating the rare earths by liquid/liquid extraction between the aqueous phase containing the rare earth nitrates and an organic phase containing an extractant that is insoluble in water, followed by the back-extraction of the rare earths from the organic phase.

The extractant thus used in the process of the invention is selected from among those extractants displaying selectivity relative to the rare earths.

Such extractant may be an anionic extractant, a solvating extractant or a cationic extractant.

Particularly exemplary anionic extractants are the long chain organic compounds containing amine functions.

The hydrocarbon chains of these compounds preferably have from about 5 to 20 carbon atoms.

The following compounds are exemplary:

(i) tertiary amines and particularly those marketed under the trademarks Alamine 336 and Adogen 364, i.e., tertiary amines of the formula $R_3N$, in which the hydrocarbon radical R has from 8 to 10 carbon atoms;

(ii) quaternary ammonium nitrates and particularly those produced from the products marketed under the trademarks Adogen 464 and Aliquat 336, comprising quaternary ammonium salts of the formula:

$$[R_3N-CH_3]^+Cl^-$$

in which the hydrocarbon radical R has from 8 to 10 carbon atoms.

The preferred cationic extractants include the organophosphorus acids, carboxylic acids and β-diketones.

The following are representative of such preferred extractants:

(i) the organophosphorus acids of the formulae:

wherein $R_1$ and $R_2$ are aliphatic or aromatic hydrocarbon radicals, such that the total number of carbon atoms in these radicals is at least equal to 10. Preferred are di(2-ethylhexyl)phosphoric acid and bis(2-ethylhexyl)-phosphonic acid;

(ii) the carboxylic acids such as marketed by the Shell Chemicals Co. under the trademark "VERSATIC" and which correspond to the general formula:

in which $R_1$ and $R_2$ are substituted or unsubstituted hydrocarbon radicals and in particular "VERSATIC" acid itself, produced by the Shell process of carboxylation of $C_9$ olefins and wherein $R_1$ and $R_2$ are hydrocarbon radicals, the sum of the carbon atoms of which is equal to 7.

The anionic or cationic extractants may be used to extract or separate the rare earth values from the aqueous solution emanating from the leaching stage. However, in this case it is desirable to first carry out a pre-neutralization using a base selected from among those indicated above, to effect precipitation of the rare earths.

Preferably, the hydroxide of the metallic cation M is used. The pH of the aqueous solution is then greater than 1.0. It depends on the particular extractant.

For this reason, it is preferred to use a solvating extractant that requires no pre-neutralization.

In a preferred embodiment of the invention, the rare earths are separated by liquid/liquid extraction by contacting the aqueous solution issuing from the leaching stage with the organic phase which contains a neutral organophosphorus compound extractant.

The extraction is preferably carried out using a neutral organophosphorus compound substantially insoluble in water and selected from among those of the following formulae:

in which formulae (I) to (IV), $R_1$, $R_2$ and $R_3$ are hydrocarbon radicals, such as aliphatic, cycloaliphatic and/or aromatic radicals. These radicals $R_1$, $R_2$ and $R_3$ may have from 1 to 18 carbon atoms, but preferably at least one of such radicals should have at least 4 carbon atoms.

The extractants of formulae (I) to (IV) may be used either alone or in admixture.

Those extractants that are commercially available are particularly preferred, such as tri-n-butylphosphate (TBP), tri-isobutylphosphate (TIBP), dibutylbutylphosphonate (DBBP), di-(2-ethylhexyl)-2-hexylphosphonate (DEHENP), and tri-n-octylphosphine (TOPO) oxide.

In a preferred embodiment of the invention, tributylphosphate or dibutylbutylphosphonate are used.

In the process of the invention, the organic phase may optionally contain, in addition to the extractant, an organic diluent. Suitable such diluents are those conventionally used to carry out liquid/liquid extractions. Exemplary thereof are the aliphatic hydrocarbons, such as, for example, dodecane and petroleum fractions of the kerosene type, aromatic hydrocarbons, such as, for example, petroleum fractions consisting of a mixture of alkylbenzenes, in particular the fractions of Solvesso type marketed by Exxon.

It is also possible to use mixtures of these diluents.

Preferably, petroleum fractions of the kerosene type are used.

The content of the extraction agent in the organic phase varies over wide limits depending on the nature of the extractant.

Its concentration advantageously ranges from 5% by volume, if the extractant is in solution in a diluent, to 100%, if the extractant is used in pure state.

A content of from 50% to 80% by volume is advantageous if tributylphosphate or dibutylbutylphosphonate is used; these being the preferred extractants according to the invention.

The organic phase may also contain different modifying agents, the essential purpose of which is to improve the hydrodynamic properties of the system without altering the complexing properties of the extractant. Suitable such compounds include, in particular, compounds having alcohol functions, especially heavy alcohols having from 4 to 15 carbon atoms. A concentration thereof of up to 20% by volume relative to the organic phase is typically favorable.

The separation of the rare earth or earths is carried out countercurrently, employing a plurality of theoretical extraction stages, each stage entailing a mixing-/decantation operation.

The aqueous phase and the organic phase are contacted with each other at a temperature which is not critical; it generally ranges from 15° to 65° C. and most typically from 20° to 50° C.

The separation stage results in the production, on the one hand, of an aqueous solution which contains the element or elements not extracted from the decomposition solution, principally iron, aluminum, calcium and the major fraction of the phosphates, arsenates, fluorides, borates, etc., and an organic phase containing the rare earths, solubilized uranium, nitric acid and minor amounts of acids corresponding to the phosphate, arsenate, and fluoride anions, if present in the original mineral treated. This is the case in the treatment of an apatite.

To improve the purity of the solution of the rare earths obtained, it is desirable to conduct a washing stage prior to the back-extraction stage.

In this washing stage, the organic phase is washed with a basic solution.

For this purpose, an ammonia solution or a solution of any alkaline metal hydroxide or carbonate may be used. However, as it is preferable not to introduce other metallic cations, the hydroxide or carbonate of the metallic cation M used in the subsequent stage of the process of the invention is employed, which preferably is a hydroxide of an alkaline earth metal, in particular calcium hydroxide.

The concentration of the solution of the base is less than 8 N, and preferably ranges from 1 N and 2 N.

The washing stage permits purification of the organic phase by eliminating the acid type impurities which are transferred into the aqueous phase.

Subsequently, a back-extraction of the rare earth values contained in the extraction solvent is carried out.

The rare earths extracted into the organic phase are separated by contacting the organic phase with water, or optionally with a dilute solution of nitric acid, having a concentration of less than about 0.3 N.

In the case where the initial mineral also contains uranium, this latter is also extracted with the rare earths into the organic phase. It is possible to back-extract the uranium values by contacting the organic phase with a solution of an alkaline metal or ammonium carbonate having a preferred concentration of 0.5 to 2 moles/liter, after the back-extraction of the rare earths.

It is possible to precipitate, from the aqueous solution, the nitrates of the rare earths recovered from the organic solvent, such rare earths being in hydroxide form, using a basic solution having a pH of about 8. It is also possible to use an ammonia solution, but it is preferred to use the hydroxide of the metallic cation M, as, after the separation of the rare earth hydroxides, the resulting aqueous phase may thus be recycled to the preparation of the wash solution or the purification of the solution depleted of rare earth values.

A purification of the aqueous solution stripped of rare earth values is then carried out, to eliminate the species solubilized during the decomposition. Particularly exemplary thereof are iron, phosphorus, aluminum, arsenic, etc.

To accomplish this, said solution is subjected to a treatment with a hydroxide or carbonate of the metallic cation M, as described above, or optionally with a precursor thereof (oxide).

Exemplary of the hydroxides of the metallic cation M are the hydroxides of the alkaline earth metals, such as calcium, barium and strontium.

Calcium hydroxide or its precursor, calcium oxide, are preferably used. It is thus possible to use calcium hydroxide or oxide in the form of a powder or an aqueous suspension.

The operation may be carried out at a temperature of from 20° to 100° C., preferably from 70° to 90° C.

The amount of the hydroxide of the metallic cation M is determined such that the resulting pH ranges from 9 to 11, and preferably is about 10.

The hydroxide of the cation M is introduced into the solution free of rare earths. This addition may be carried out continuously or discontinuously, gradually or all at once.

The time period between the addition of the metallic cation M and the separation of the precipitate, for a discontinuous process, or the retention time in a continuous process, may vary over wide limits, for example from 10 min to 10 hours, but advantageously ranges from 1 to 3 hours.

The precipitate obtained, which contains the impurities to be eliminated, is separated from the reaction medium by conventional liquid/solid separation techniques, e.g., filtration, decantation, hydro-extraction and centrifugation.

The liquid phase is a solution containing the cation M, preferably calcium nitrate.

In the last stage of the process of the invention, the nitric acid is regenerated by treating the liquid phase obtained with sulfuric acid.

Concentrated sulfuric acid (98%) or a dilute acid may be used. Preferably, 85% to 90% sulfuric acid is used.

The operation is advantageously carried out at a temperature of from 20° to 100° C., but preferably from 30° to 50° C.

The amount of sulfuric acid employed is calculated such that it will be equal to the amount of nitric acid employed.

During the treatment, the metallic cation M precipitates in the form of its sulfate. The precipitate is $CaSO_4 \cdot 0.5H_2O$, if the metallic cation M is calcium.

The precipitate is then separated from the reaction medium by conventional liquid/solid separation techniques.

A nitric acid solution is recovered, which may be recycled to the beginning of the process. In one embodiment of the invention, the nitric acid solution may contain a salt providing nitrate ions, in particular a nitrate of the metallic cation M.

The present invention will now be described in relation to the preferred embodiment illustrated in FIG. 1 of the Drawings:

Into a reactor 1, a mineral containing rare earth values is introduced via inlet 2, and a solution of nitric acid is introduced via line 3.

Following the solubilization of the mineral containing the rare earths, the insoluble residues are separated in a separator 4 and, if necessary, discharged via outlet 5.

A liquid phase containing the nitrates of the rare earths, as well as the solubilized impurities, is withdrawn through line 6.

In vessel 7, the rare earths are separated and an aqueous phase thereof is withdrawn via outlet 8.

Into a reactor 9, the solution stripped of the rare earth values is introduced through line 10 and the hydroxide of the metallic cation M is introduced via inlet 11.

The impurities are then separated in separator 12 and discharged via outlet 13.

The solution purified of the impurities is then introduced into a reactor 14 through line 15 and the sulfuric acid is introduced via inlet 16.

The sulfate of the metallic cation M is next separated in separator 17 and discharged via outlet 18.

Through outlet line 19 a solution of the nitric acid is withdrawn, which may be recycled to the decomposition reaction in reactor 1 via line 3.

By virtue of the combination of these several stages, the process of the invention is particularly advantageous in terms of absence of pollution (environment) and economics.

The subject process thus permits the treatment of minerals having low rare earth contents, heretofore not industrially feasible in this art.

In order to further illustrate the present invention and the advantages thereof, the following specific examples are given, it being understood that same are intended only as illustrative and in nowise limitative.

In said examples to follow, all parts and percentages are given by weight, unless otherwise indicated.

EXAMPLE 1

(a) In this example, apatite was used as the mineral containing the rare earth values.

The composition of the mineral was as follows:

| | |
|---|---|
| $P_2O_5$ = | 2.75% |
| $Fe_2O_3$ = | 5.6% |
| CaO = | 7.0% |
| $SiO_2$ = | 87.7% |
| $RE_2O_3$ = | 0.43% |
| $UO_3$ = | 30 ppm |

The percent distribution of the respective rare earths was the following:

| | |
|---|---|
| $Y_2O_3$ | 19.5 |
| $La_2O_3$ | 14.5 |
| $CeO_2$ | 33.5 |
| $Pr_6O_4$ | 4.4 |
| $Nd_2O_3$ | 13.0 |
| $Sm_2O_3$ | 2.5 |
| $Eu_2O_3$ | 0.25 |
| $Gd_2O_3$ | 4.7 |
| $Tb_2O_3$ | 0.5 |
| $Dy_2O_3$ | 1.0 |
| $Ho_2O_3$ | 1.8 |
| $Er_2O_3$ | 1.8 |
| $Tm_2O_3$ | <0.2 |
| $Yb_2O_5$ | 0.5 |
| $Lu_2O_3$ | <0.2 |
| $ThO_2$ | 1.5 |

Figure 1:
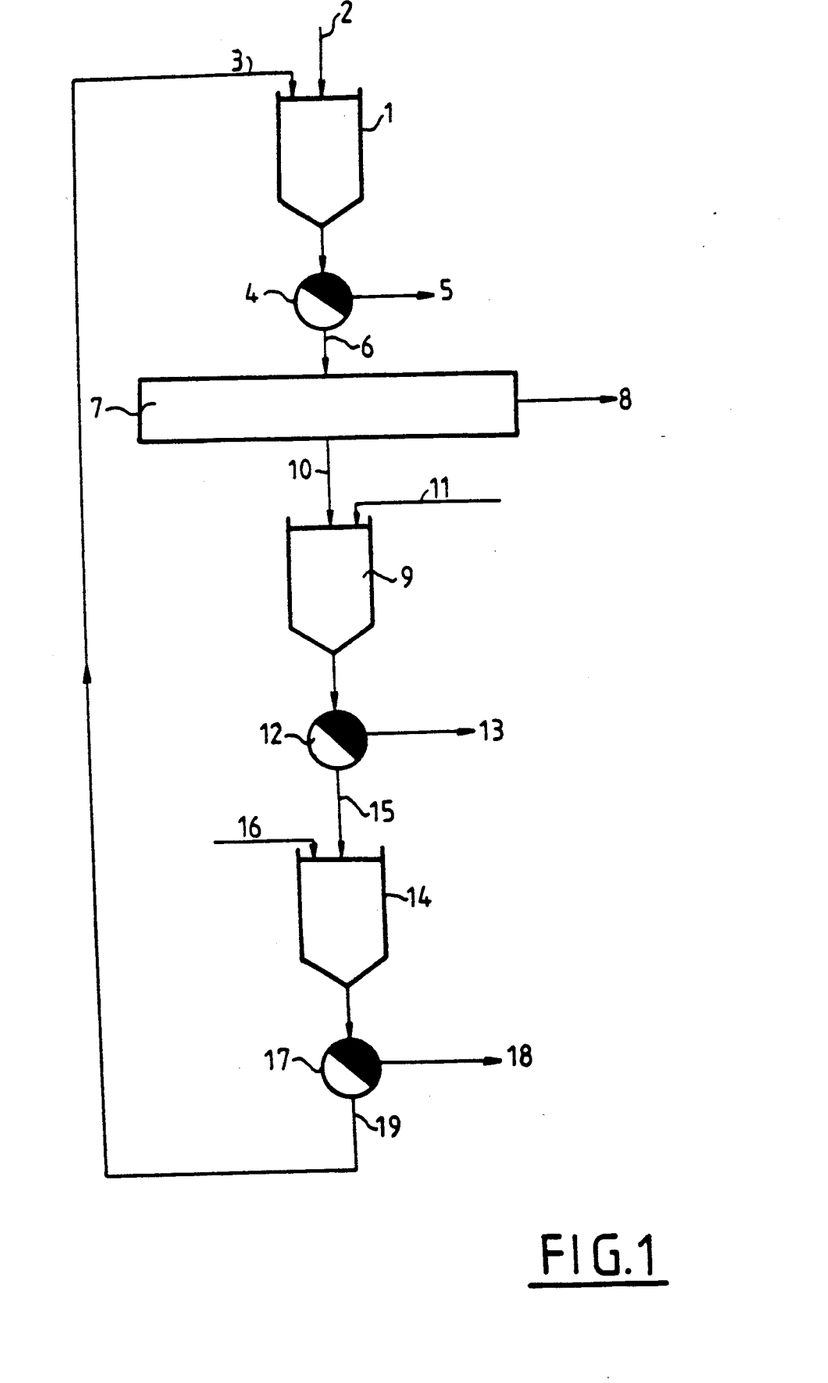
FIG. 1 is a schematic/diagrammatic illustration one preferred embodiment of the process/apparatus for the recovery of rare earth values according to the present invention.

The process of the invention was carried out according to the preferred embodiment shown in FIG. 1.

(b) In a first stage, the mineral was acidulated and decomposed with nitric acid in order to solubilize the rare earths:

Into a 100 liter reactor 1, 50 kg of the mineral were introduced through inlet 2 and 25 liters of a 3.2 N solution of nitric acid, containing calcium nitrate $Ca(NO_3)_2$ in a proportion of 2.4 moles/liter, were introduced via line 3.

The operation was carried out at ambient temperature (20° C.) employing mechanical agitation.

The retention time was 30 min.

In separator 4, 46.5 kg of insoluble residues were separated by filtration and discharged via outlet 5.

Through line 6, 25 liters of a solution containing 8.55 g/l rare earths, expressed as $RE_2O_3$, 50 g/l phosphoric acid and 60 mg/l uranium, expressed as $UO_3$, were withdrawn.

Figure 2:
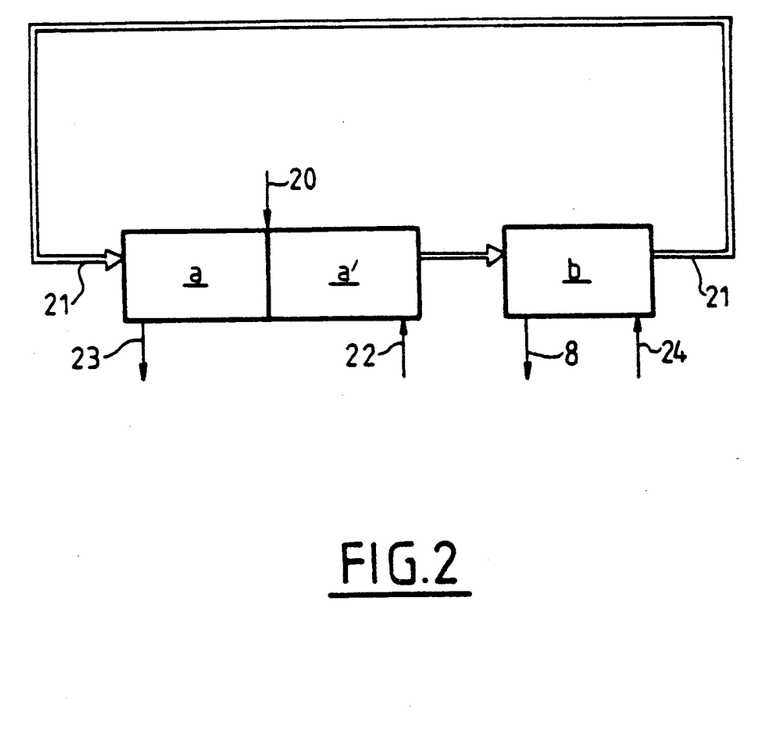
FIG. 2 is a schematic/diagrammatic illustration of suitable liquid/liquid extraction battery used for separating the rare earths in the process/apparatus shown in FIG. 1.

(c) Subsequently, the rare earth values were separated by subjecting the above solution to a liquid/liquid extraction operation carried out in the apparatus shown in FIG. 2 of the Drawings.

Such apparatus comprised a battery with several stages of the mixer/decanter type, operating countercurrently and including an extraction section (a) and a wash section (a') comprising 7 theoretical stages, as well as a back-extraction section (b) for the rare earths extracted into the organic phase, comprising 5 theoretical stages.

The extractant used was dibutylbutylphosphonate. It was diluted 50% by volume in kerosene. The mixture was the extraction solvent.

25 Liters of the aqueous solution emanating from the mineral decomposition stage and withdrawn via line 6 were introduced through inlet 20 into the sixth stage of the battery.

Via recycle 21, the extraction solvent was introduced, in a proportion of 5 liters.

Milk of lime was introduced through inlet 22, in a proportion of 120 g/l into the wash section.

Through line 23, at the inlet end of the extraction section, 26.15 liters of a solution containing lanthanum and cerium, in respective concentrations of 0.9 g/l and 1.07 g/l, expressed as the oxide, but completely devoid of any other rare earth values, were withdrawn.

At the outlet end of the back-extraction section,
in countercurrent to the flow of the organic phase, 3.5 liters of water were introduced via inlet 24.

3.5 Liters of a solution of rare earth nitrates were withdrawn via outlet 8, having a concentration, expressed as rare earth oxides, of 44 g/l.

(d) The solution stripped of rare earth values withdrawn through outlet 23 was next purified.

To effect this purification, 26.15 liters of such solution were introduced, via line 10, into the reactor 9, as were 3.5 kg of milk of lime, at a concentration of 300 g/l, via inlet 11.

12.5 kg of a moist phosphate residue were separated in separator 12 by filtration, which were discharged via outlet 13.

27.2 Liters of a filtrate containing essentially calcium nitrate were recovered through line 15.

(e) Regeneration of nitric acid in a final stage:

Into the reactor 14, the filtrate 15 and 2.5 liters of an 88% aqueous solution of sulfuric acid were introduced.

11.5 kg moist calcium sulfate were separated by filtration in separator 17, which were discharged via outlet 18.

Through line 19, 25 liters of a 3.14 N aqueous solution of nitric acid containing 2.4 moles/liter calcium nitrate were recovered.

This solution was recycled to the decomposition reactor via line 3. In effect, its quality was determined. An aliquot fraction of 2 liters was withdrawn to decompose 1 kg of the mineral ore. The results obtained were in conformity with those expected.

(f) Treatment of 3.5 liters of the solution purified of rare earth nitrates, withdrawn via outlet 8, to recover the rare earth values therefrom, by the addition of 88 g lime freshly calcined at 950° C.

183 g Hydroxides of rare earths were precipitated and separated by filtration. The filtrate of this separation was used to wash the precipitate recovered from outlet 13.

3.5 Liters of a filtrate used for the preparation of the milk of lime introduced via inlet 22 were recovered.

The rare earths could be recovered in the form of the oxides thereof, after calcination for 1 hour at 700° C.

EXAMPLE 2

The procedure of Example 1 was repeated, but modifying the conditions of the extraction of the rare earths.

The apparatus used was a battery with several stages of the mixer/decanter type, operating countercurrently and including an extraction section (a) and a wash section (a') comprising 5 theoretical stages and a back-extraction section (b) of rare earth extracted in the organic phase, comprising 5 theoretical stages.

The extractant used was dibutylbutylphosphonate. It was diluted 50% by volume in kerosene. The mixture constituted the extraction solvent.

25 Liters of the aqueous solution in line 6 emanating from the mineral decomposition stage were introduced into the fourth stage of the battery.

The extraction solvent was introduced via line 21 in a quantity of 15 liters.

A 120 g/l milk of lime solution was introduced into the wash section via inlet 22.

From the inlet end of extraction section, via outlet 23, 26.5 liters of a solution completely stripped of rare earths values, were collected.

A back-extraction of the rare earths from the organic phase was carried out exactly as in Example 1.

From outlet 8, a solution of rare earth nitrates having a concentration, expressed as rare earth oxides, of 61 g/l, was collected.

EXAMPLE 3

(a) In this example, a bastnasite ore containing 30% rare earth oxides was used.

(b) Initially, a preliminary heat treatment was carried out. 113.6 g of the mineral were calcined at 700° C. for one hour.

(c) Decomposition of calcined material at 80° C. for 2 hours using a 3.2 N aqueous solution of nitric acid containing 2.4 moles/liter calcium nitrate:

After cooling and filtration, on the one hand, 60 g of an insoluble residue containing 50% of the cerium initially present, and, on the other, after washing with water, 370 cm$^3$ of a solution containing more than 90% by weight of the other initial rare earths, were obtained.

(d) Subjecting such solution to the various treatments described in Example 2:
 (i) a liquid/liquid extraction of all of the rare earths in the form of the nitrates in an organic phase, such as described in Example 1, and back-extraction of the rare earths of the organic phase with water;
 (ii) treating the solution stripped of rare earth values with milk of lime, which enabled separation by filtration of metallic impurities and the fluorine precipitated;
 (iii) regeneration of the aqueous solution of nitric acid by means of a sulfuric acid treatment of the solution resulting from the above stage (ii);
 (iv) recycling of the aqueous solution of nitric acid into the decomposition stage.

EXAMPLE 4

(a) In this example, a residue from the manufacture of neodymium/iron/boron magnets was treated according to the process of the invention.

The composition of the residue was as follows:

| | |
|---|---|
| Nd = | 36.3% |
| Fe = | 60.9% |
| B = | 0.92% |
| Ca = | 1.1% |
| Al = | 0.34% |

(b) In a first stage, the above residue was dissolved by the gradual addition of 20 g of the residue to 300 cm$^3$ of a 3.2 N aqueous solution of nitric acid containing 2.4 moles/liter calcium nitrate.

(c) In a second stage, the neodymium was separated by quantitative extraction using an organic solvent containing dibutylbutylphosphonate in a proportion of 50% by volume in kerosene.

An aqueous phase devoid of neodymium and containing all of the iron, aluminum and boron was recovered.

(d) As in Example 1, said aqueous phase was stripped of its impurities by quantitatively precipitating the iron and the aluminum at pH 4.5 by means of the milk of lime. The precipitate of the hydroxides of such cations was separated by filtration.

(e) In a final stage, the nitric acid solution was regenerated as in Example 1 using sulfuric acid, which permitted the recycling thereof.

EXAMPLE 5

(a) In this example, an anatase mineral was treated; in this mineral, the rare earth material essentially was rhabdophanite.

The composition of the mineral was as follows: $TiO_2 = 82.5\%$; $P_2O_5 = 1.8\%$; $Fe_2O_3 = 6.1\%$; $SiO_2 = 3.4\%$; $Al_2O_3 = 3.3\%$; $CaO = 1\%$ and rare earth oxides = 1%.

(b) In a first stage, the mineral was leached by treating, at 80° C. and for 2 hours, 1.5 kg of the mineral having a grain size of $\leq 1$ mm per liter of a 4 N aqueous solution of nitric acid containing 2 moles/liter of calcium nitrate.

After filtering and cooling, on the one hand, 1.4 kg of a dry residue, and, on the other, after washing with water, 1.05 liter of a solution containing 10.5 g/l iron, 7.6 g/l aluminum, 2 g/l barium, 0.2 g/l titanium, 13.6 g/l rare earth oxides and 35.2 g/l phosphoric acid, were obtained.

(c) This solution was then subjected to the various treatments described in Example 2:
 (i) a liquid/liquid extraction of all of the rare earth values in the form of nitrates in an organic phase, such as described in Example 1, and back-extraction of the organic phase with water;
 (ii) a treatment of the solution stripped of rare earth values using milk of lime, which permitted separation by filtration of the metallic impurities and the phosphorus precipitated;
 (iii) regeneration of the aqueous solution of nitric acid by treating the solution issuing from the preceding stage with sulfuric acid; and
 (iv) recycling the aqueous nitric acid solution to the decomposition stage.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the recovery of rare earth values from a rare earth mineral, comprising (a) leaching/decomposing such rare earth mineral with a solution of nitric acid to solubilize the rare earth values contained therein, (b) optionally separating insoluble residue from the resulting leach solution, (c) separating the rare earth values from said leach solution, (d) treating the leach solution thus stripped of rare earth values with a hydroxide of a metallic cation M to precipitate solubilized impurities and separating the thus precipitated impurities therefrom, (e) treating the resulting purified solution with sulfuric acid to precipitate metal sulfates and separating the thus precipitated sulfates therefrom to regenerate said nitric acid solution, and (f) optionally recycling such regenerated solution of nitric acid to said leaching/decomposition step (a).

2. The process as defined by claim 1, said starting rare earth mineral comprising a phosphate, fluocarbonate, carbonate or silicate.

3. The process as defined by claim 1, said starting rare earth mineral comprising a residue containing a rare earth salt or metal.

4. The process as defined by claim 2, said starting rare earth mineral comprising apatite or bastnasite.

5. The process as defined by claim 3, said starting rare earth mineral comprising the residue of production of samarium/cobalt or neodymium/iron/boron magnets.

6. The process as defined by claim 1, comprising (a) leaching/decomposing the rare earth mineral with a stoichiometric excess of said solution of nitric acid.

7. The process as defined by claim 6, said stoichiometric excess ranging from 5% to 10%.

8. The process as defined by claim 1, said leaching-/decomposition step (a) being carried out in the presence of a nitrate salt.

9. The process as defined by claim 8, said nitrate salt comprising the nitrate of a metallic cation M.

10. The process as defined by claim 9, said nitrate salt comprising calcium nitrate.

11. The process as defined by claim 8, wherein the amount of nitrate salt present is such that the resulting solution has a nitrate ion concentration ranging from more than 3 to less than 10 moles/liter.

12. The process as defined by claim 1, comprising
(c) separating the rare earth values by liquid/liquid extracting said leach solution, containing rare earth nitrates, with an organic phase which comprises a water-insoluble rare earth extractant.

13. The process as defined by claim 12, further comprising back-extracting the rare earth values into an aqueous phase.

14. The process as defined by claim 12, said rare earth extractant comprising an anionic, solvating or cationic extractant.

15. The process as defined by claim 14, said extractant comprising a phosphate, phosphonate, phosphinate or phosphine oxide.

16. The process as defined by claim 15, said extractant comprising tributylphosphate or dibutylbutylphosphonate.

17. The process as defined by claim 12, said organic phase comprising a hydrocarbon diluent.

18. The process as defined by claim 12, comprising washing said organic phase with a basic solution.

19. The process as defined by claim 18, said basic solution comprising a hydroxide or carbonate of the metallic cation M.

20. The process as defined by claim 19, said basic solution comprising calcium hydroxide.

21. The process as defined by claim 13, said aqueous phase comprising water.

22. The process as defined by claim 1, comprising
(d) treating the leach solution thus stripped of rare earth values with such amount of M hydroxide or carbonate as to provide a pH ranging from 9 to 11.

23. The process as defined by claim 22, comprising treating the leach solution with calcium hydroxide or precursor thereof.

24. The process as defined by claim 23 comprising treating the leach solution at a temperature ranging from 70° to 90° C.

25. The process as defined by claim 1, comprising
(e) treating the purified solution with 85% to 98% by weight concentrated sulfuric acid.

26. The process as defined by claim 25, comprising treating the purified solution at a temperature ranging from 30° to 50° C.

27. The process as defined by claim 1, comprising
(f) recycling the regenerated solution of nitric acid to the leaching/decomposition step (a).

28. The process as defined by claim 1, comprising
(b) separating insoluble residue from the resulting leach solution.

29. The process as defined by claim 1, comprising
(c) separating the rare earth values as the hydroxide or carbonate precipitates thereof.

30. The process as defined by claim 1, comprising preliminarily comminuting the starting rare earth mineral.

31. The process as defined by claim 30, comprising comminuting the starting rare earth mineral to a particle size ranging from 4 μm to 2 mm.

32. The process as defined by claim 31, comprising comminuting the starting rare earth mineral to a particle size of no more than 1 mm.

33. The process as defined by claim 1, said starting rare earth mineral having a content in rare earth values, expressed as the oxides thereof, of less than 0.1% by weight.

* * * * *